April 22, 1952        G. O'NEILL        2,594,065

AUTOMOBILE ROOF SLEEPING ENCLOSURE

Filed Nov. 19, 1949        3 Sheets-Sheet 1

INVENTOR.
GEORGE O'NEILL.
BY
Robert A. Sloman
ATTORNEY.

April 22, 1952  G. O'NEILL  2,594,065
AUTOMOBILE ROOF SLEEPING ENCLOSURE
Filed Nov. 19, 1949  3 Sheets-Sheet 2

INVENTOR.
GEORGE O'NEILL.
BY
Robert A. Sloman
ATTORNEY.

April 22, 1952     G. O'NEILL     2,594,065
AUTOMOBILE ROOF SLEEPING ENCLOSURE
Filed Nov. 19, 1949     3 Sheets-Sheet 3

INVENTOR.
GEORGE O'NEILL.
BY Robert A. Sloman
ATTORNEY.

Patented Apr. 22, 1952

2,594,065

UNITED STATES PATENT OFFICE 2,594,065

AUTOMOBILE ROOF SLEEPING ENCLOSURE

George O'Neill, St. Clair Shores, Mich.

Application November 19, 1949, Serial No. 128,434

8 Claims. (Cl. 135—1)

This invention relates to a sleeping compartment adapted for mounting and securing upon the roof of a vehicle such as an automobile.

More particularly the present invention relates to a platform which is suitably positioned horizontally above the vehicle roof and immovably secured thereto, there being a hollow framework upon said platform over which a tent-like enclosure is positioned and supported.

It is the further object of this invention to provide a sleeping compartment for the roof of an automobile which may be readily collapsed when not in use, and which may be re-erected quickly.

It is the further object of the present invention to provide a sleeping compartment for the roof of a vehicle which is simple of construction and inexpensive to manufacture.

These and other objects will be seen from the following specification and claims in conjunction with the appended drawings in which:

Figure 1:
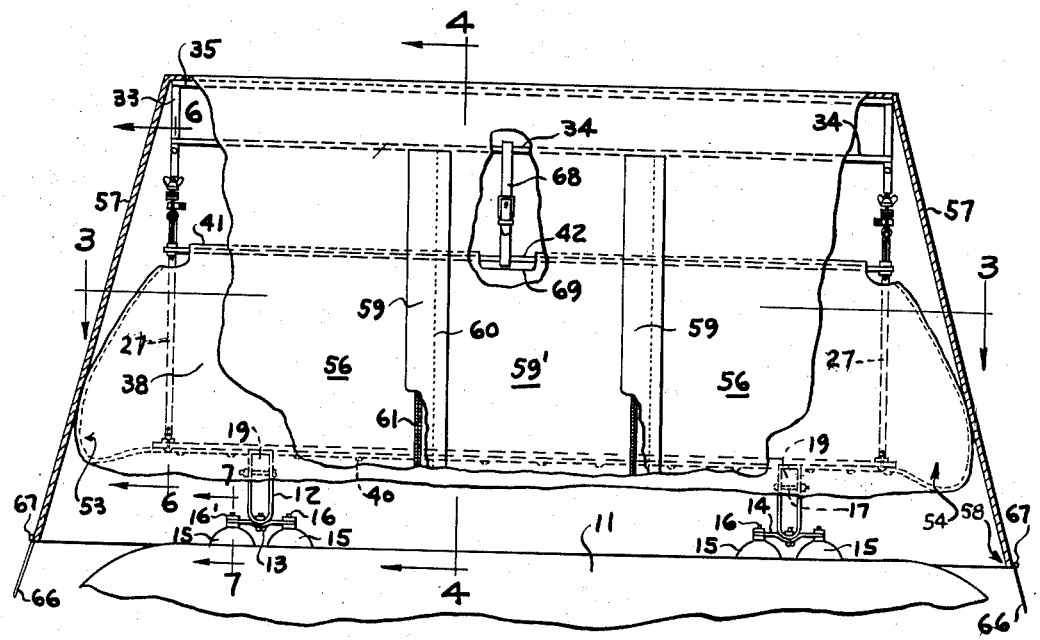
Fig. 1 is a partially broken away side elevational view of the sleeping compartment as mounted upon an automobile roof which is fragmentarily shown.

It will be understood that the above drawings illustrate merely a preferred embodiment of the invention, and that other embodiments are contemplated within the scope of the claims hereafter set out.

Referring to the drawings the vehicle top surface 11 has arranged thereon the four spaced upright brackets 12 from which depend the rubber suction cups 15 for cooperative retaining engagement with said top surface or vehicle roof. Transverse cup supporting straps or plates 14 extend across the lower portion of the brackets 12 and are secured thereto by the bolts 13.

Figure 7:
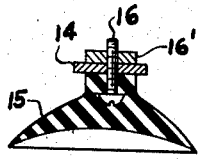
Fig. 7 is an enlarged section on line 7—7 of Fig. 1.

The screws or bolts 16 project upwardly through the central portion of the securing cups 15 as shown in Figs. 1 and 7 and through corresponding openings in the plates 14, and are secured thereto as by the nuts 16'.

Figure 2:
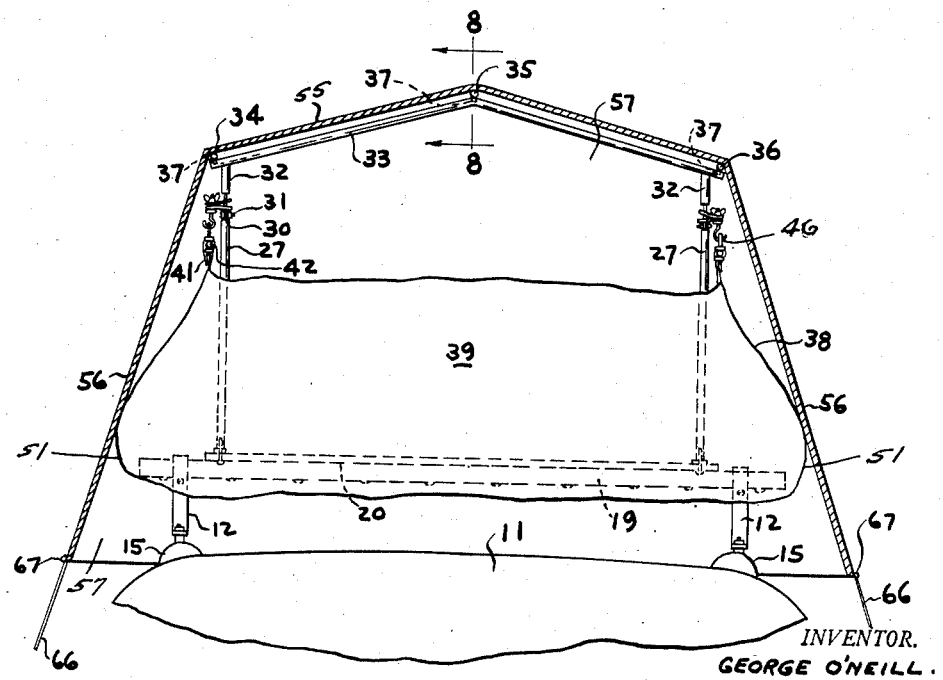
Fig. 2 is a partially broken away and sectioned end elevational view thereof.

Cross-supports 19 extend transversely across the roof 11 adjacent its opposite ends in parallel spaced relation, and the end portions of cross-supports 19 project through the brackets 12 as shown in Fig. 2 and are immovably secured thereto by the cross-bolts 17 which extend through the brackets 12.

Figure 3:
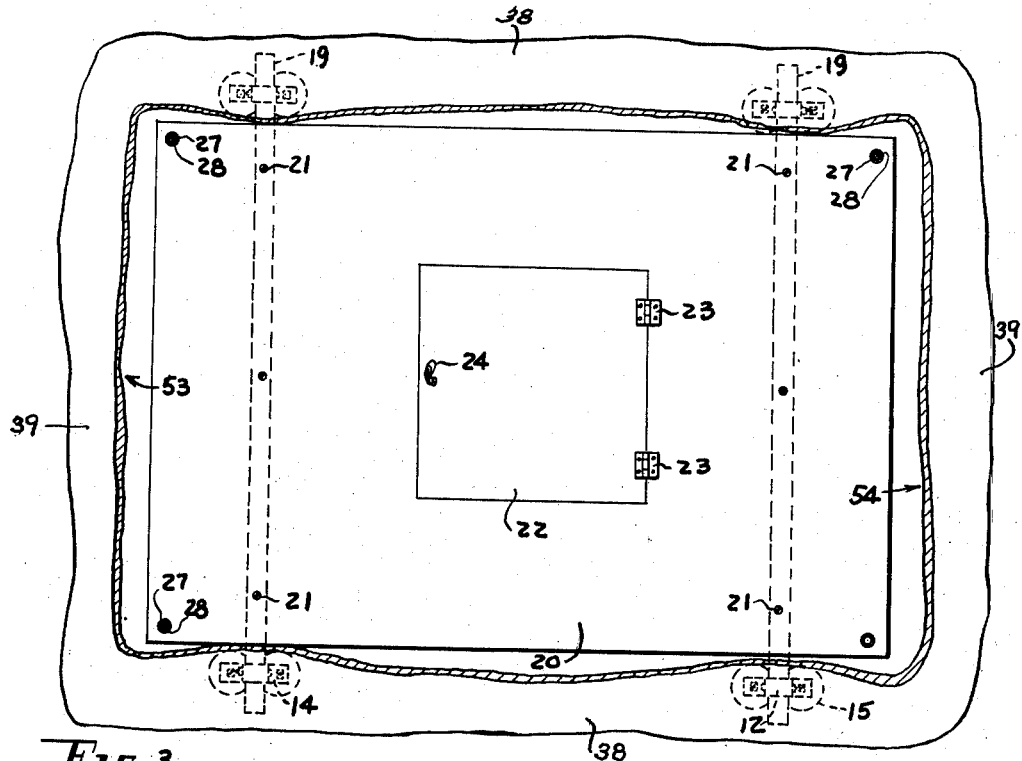
Fig. 3 is a section on line 3—3 of Fig. 1.
Figure 4:
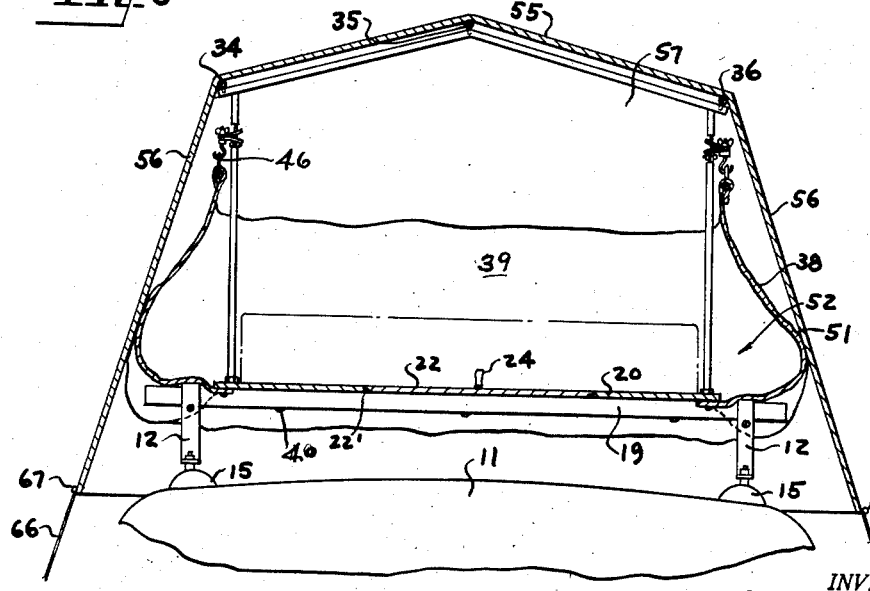
Fig. 4 is a section on line 4—4 of Fig. 1.

Rectangularly shaped platform 20 is positioned upon and across the cross-supports 19 as illustrated in Figs. 2, 3 and 4, and is secured to said cross-supports as by the screws 21, Fig. 3.

A second use is contemplated for the sleeping compartment that is using the same as a fishing shanty, and for that purpose a rectangular opening is formed in the platform 20 having a marginal flange 22' which supports the trap door 22 which is hinged at 23 and which is provided upon its opposite side with a flexible handle 24 for lifting said trap door to open position, permitting fishing therethrough.

Arranged adjacent the corners of platform 20 and projecting upwardly therefrom are a plurality of relatively long upstanding bolts 25 secured in position by the nuts 26. Hollow tubes 27 are arranged in upright position adjacent said corners and mounted over said bolts 25 and bear upon the nuts 26, one of such tubes being indicated in Fig. 6.

Figure 6:
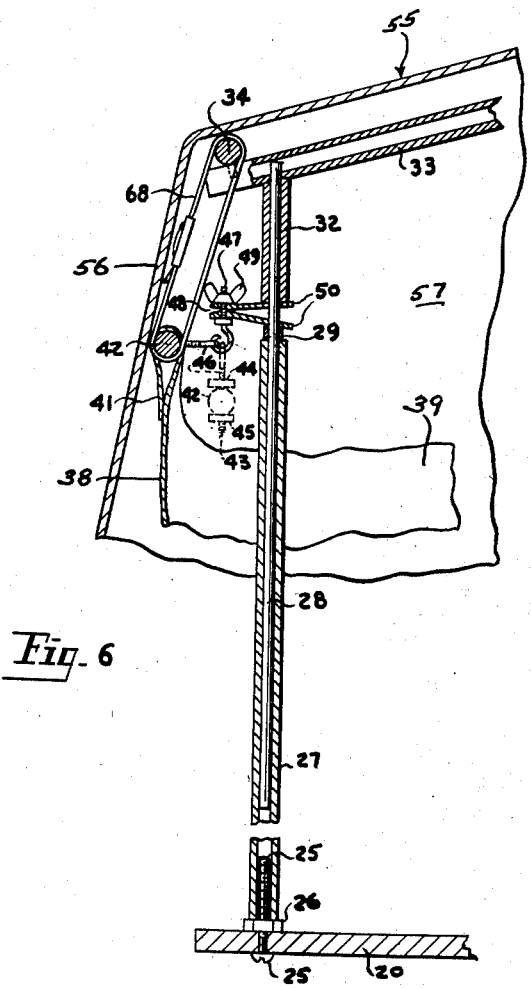
Fig. 6 is an enlarged section on line 6—6 of Fig. 1.
Figure 8:
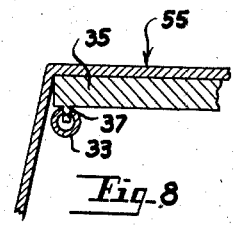
Fig. 8 is an enlarged section on line 8—8 of Fig. 2.

Upright vertically adjustable rods 28 are slidably and adjustably positioned within each of the tubes 27, and each rod has adjustably secured thereon the stops 29, which include the outwardly projecting clamps 30, as shown in Fig. 2 adjustably joined together by the bolts 31 whereby said stops 29 may be secured in any desired longitudinal position relative to the rods 28. The stops 29 bear against and upon the upper ends of the tubes 27 to thereby secure said rods in the desired vertically adjusted position relative to said tubes, said rods projecting upwardly above said tubes as shown in Fig. 6.

Tubular upwardly converging roof beams 33 are arranged in parallel spaced relation at opposite ends of the platform 20 and have downwardly extending tubular extensions 32 which depend therefrom and which are adapted for positioning over the upper ends of the respective rods 28, the upper ends of said rods 28 bearing against the interior surface of the roof beams 33.

As shown in Figs. 1, 2 and 4 there are provided a plurality of longitudinally extending parallel spaced cross bars 34, 35 and 36 which interconnect the roof beams 33 at opposite ends of said platform 20. Securing pins 37 depend from opposite ends of each of the cross-bars 34, 35 and 36 and retainingly extend within corresponding transverse openings in the upper surfaces of the roof beams 33, as illustrated in Fig. 6.

Hollow flexible fabric enclosure 38—39, the sides being indicated by the numeral 38 and its integral ends indicated by the numeral 39, is secured at its lower periphery upon and around the lower surface of the platform 20 as by the securing elements 40 which may be tacks or any other suitable securing device.

The upper ends of the side walls 38 of said enclosure have formed the looped over portions 41 which define longitudinal slots throughout the sides of said enclosure and which cooperatively receive the longitudinal shafts 42. The hooks 46 with downwardly extending threaded shanks 43 project through the outer ends of of the shafts 42 and are secured thereto by the two nuts 44 and 45 in the manner illustrated in Fig. 6.

Corresponding inverted hooks 47 cooperable with hooks 46 for supporting the fabric enclosure 38—39 have upstanding threaded shanks which project through the securing clamp elements 48 and are secured thereto by the wing nuts 49. The inner ends 50 of the clamp elements 48 have transverse openings therethrough to cooperatively receive upper portions of the upright rods 28, and the lower of the clamp elements 48 is supported upon the adjustable stop 29 in the manner illustrated in Fig. 6.

Thus it is apparent that the longitudinal shafts 42 support the enclosure 38—39 throughout its length, with the ends of said shafts being removably mounted upon the hooks 47 carried by the adjustable stops 29 upon the respective shafts 28. Depending upon the adjustment of the stops 29 it is apparent that the side walls 38 may be raised and lowered as desired within the limits of the material which comprises the side walls 38 as well as the interconnecting integral end walls 39.

Referring to Fig. 4 there is an excess of material 51 forming a part of the sides 38 of said enclosure which may be looped outwardly and downwardly as shown to thereby define lateral extensions of the platform 20 upon which a child could sleep. Naturally the shafts 42 would have to be lowered sufficiently to permit this outward bowing of the side portions 38 of the inner enclosure 38—39.

Similarly the ends walls 39 are formed with an excess of material as at 53 and 54 Fig. 3 to thereby provide additional supporting bowed outwardly and downwardly extensions which would have many uses and could be used if desired for third and fourth children.

An outer flexible fabric water-proof tent-like enclosure 55 with downwardly depending side walls 56 Fig. 4 and integral interconnecting end walls 57 is mounted over the spaced roof beams 33 as well as the interconnecting cross rods 34, 35 and 36 which support said enclosure throughout its length. The side and end walls 56 and 57 depend downwardly and outwardly upon the outside of the inner flexible enclosure 38—39 and preferably extend at least below the platform 20 such as indicated at 58 in Fig. 1.

A side door or flap 59' is formed or cut from one of the side walls 56 as shown in Fig. 1 and its spaced vertical edges are secured to the remainder of the wall 56 as by the two zippers 61, there being suitable upright zipper covering flaps 59 which are secured to the outside of the walls 56 as by the vertical seams 60 shown.

Referring to Fig. 4 the bowed portions 51 will define the concave extensions 52 which may have many uses, such as for storage of articles and clothes, or which may be slept in by a child or baby. Similarly the extended portions 53 and 54 as shown in Fig. 3 provide for the concave extensions 54 and 53 which can also be used for storage, or may be used by a child.

The side and end walls 56 and 57 of the tent-like enclosure 55 extend generally downward and outwardly from the roof beams 33 and their interconnecting cross-rods 34, 35, and 36. Guy wires or ropes 66 are joined at 67 to the respective lower corners of enclosure 55, and the lower ends of said ropes may be joined preferably to the vehicle body or fenders, or on the other hand may be anchored in the ground if desired.

It is contemplated that the platform 20 may be mounted directly upon the ground, or upon the ice, and in that case the lower corners of the enclosure 55 may be joined or held down by the rope 66 with the free ends thereof either secured directly to the platform 20 or an extension thereof, or secured to the ground.

Under some circumstances to eliminate draft it is desirable to bring the upper end of the inner enclosure 38 into contact with the side walls 56 of enclosure 55, and this is accomplished as shown in Fig. 6. The side walls 38 of the inner enclosure are cut away preferably at their central portion at 69 providing access to the shafts 42. Adjustable straps 68 extend under the shafts 42 and are looped over the corresponding roof cross-rods 34 or 36. By tightening straps 68 as desired, the shafts 42 may be pivoted outwardly and upwardly about their hook supports until the inner enclosure is brought into contact with the outer enclosure.

Figure 5:
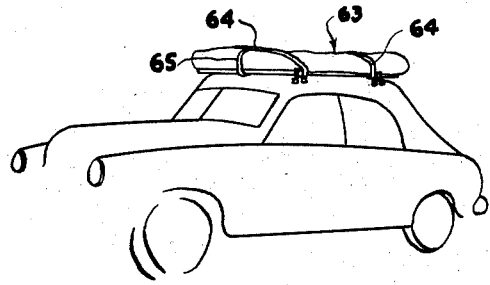
Fig. 5 is a fragmentary perspective view of an automobile with the collapsed sleeping compartment secured thereon.

As shown in Fig. 5 the sleeping enclosure above described has been collapsed as indicated at 63, and transverse straps 64 as well as the longitudinal strap 65 effectively secure the collapsed enclosure upon the roof of the vehicle.

Having described my invention reference should now be had to the claims which follow for determining the scope thereof.

I claim:

1. In a sleeping enclosure a platform, a tent support thereon including upright tubes adjacent the corners of said platform and mounted thereon, vertically adjustable rods within said tubes and projecting upwardly therefrom, and a flexible side and end wall enclosure with its lower periphery extending under and joined to the underside of said platform throughout its periphery, and with the upper periphery of said enclosure supportably and removably joined to said rods adjacent the upper ends of said tubes.

2. In a sleeping enclosure a platform, a tent support thereon including upright tubes adjacent the corners of said platform and mounted thereon, vertically adjustable rods within said tubes and projecting upwardly therefrom, stops on said rods adjustably clamped thereto and supportingly engageable with the upper ends of said tubes, a flexible side and end wall enclosure with its lower periphery joined to the under side of said platform throughout its periphery, and clamp elements on said rods bearing upon said stops supportably and removably joined to the upper periphery of said enclosure.

3. In a sleeping enclosure a platform, a tent support thereon including upright tubes adjacent the corners of said platform and mounted thereon, vertically adjustable rods within said tubes and projecting upwardly therefrom, outwardly extending hooks mounted upon said rods above said tubes, and a flexible side and end wall enclosure with its lower periphery joined to the under side of said platform, and with its upper periphery supportably and removably joined to said hooks.

4. In a sleeping enclosure a platform, a tent support thereon including upright tubes adjacent the corners of said platform and mounted thereon, vertically adjustable rods within said tubes and projecting upwardly therefrom, outwardly extending hooks mounted upon said rods above said tubes, and a flexible side and end wall enclosure with its lower periphery joined to the under side of said platform, a longitudinal slotted portion formed at the tops of the sides of said enclosure, and supporting shafts projected through said slotted portions with their ends joined to said hooks.

5. In a sleeping enclosure a platform, a tent support thereon including upright tubes adjacent the corners of said platform and mounted thereon, vertically adjustable rods within said tubes and projecting upwardly therefrom, outwardly extending hooks mounted upon said rods above said tubes, a flexible side and end wall enclosure with its lower periphery joined to the under side of said platform, a longitudinal slotted portion formed at the tops of the sides of said enclosure, supporting shafts projected through said slotted portions, and upstanding hooks mounted at the ends of said shafts removably engageable with said first mentioned hooks.

6. In a sleeping enclosure a platform, a tent support thereon including upright tubes adjacent the corners of said platform and mounted thereon, vertically adjustable rods within said tubes and projecting upwardly therefrom, and a flexible side and end wall enclosure with its lower periphery extending under and joined to the underside of said platform throughout its periphery, and with the upper periphery of said enclosure supportably and removably joined to said rods adjacent the upper ends of said tubes, the side walls of said enclosure being bowed outwardly and downwardly substantially throughout their length adjacent said platform to form lateral extensions thereof.

7. In a sleeping enclosure a platform, a tent support thereon including upright tubes adjacent the corners of said platform and mounted thereon, vertically adjustable rods within said tubes and projecting upwardly therefrom, and a flexible side and end wall enclosure with its lower periphery extending under and joined to the underside of said platform throughout its periphery, and with the upper periphery of said enclosure supportably and removably joined to said rods adjacent the upper ends of said tubes, the end walls of said enclosure being bowed outwardly and downwardly throughout their length adjacent said platform to form longitudinal extensions thereof.

8. In a sleeping enclosure a platform, a tent support thereon including upright tubes adjacent the corners of said platform and mounted thereon, vertically adjustable rods within said tubes and projecting upwardly therefrom, upwardly converging roof beams at opposite ends of said platform mounted upon said rods, outwardly extending hooks mounted upon said rods above said tubes, and a flexible side and end wall enclosure with its lower periphery joined to the under side of said platform, a longitudinal slotted portion formed at the tops of the sides of said enclosure, supporting shafts projected through said slotted portions with their ends joined to said hooks, spaced cross-rods interconnecting said roof beams, and adjustable straps interconnecting said shafts with an adjacent cross-rod, whereby said shafts may be swung outwardly and upwardly to correspondingly move upper portions of said enclosure.

GEORGE O'NEILL.

REFERENCES CITED

The following references are of record in the file of this patent:

UNITED STATES PATENTS

| Number | Name | Date |
|---|---|---|
| 785,571 | Raines et al. | Mar. 21, 1905 |
| 971,613 | Hollister | Oct. 4, 1910 |
| 1,170,188 | Rasmussen et al. | Feb. 1, 1916 |
| 1,204,329 | Wilkins | Nov. 7, 1916 |
| 1,291,947 | Linville | Jan. 21, 1919 |
| 1,734,170 | Leffert | Nov. 5, 1929 |
| 2,236,091 | Fletcher | Mar. 25, 1941 |
| 2,444,695 | Crites | July 6, 1948 |
| 2,469,987 | Pilsner | May 10, 1949 |

FOREIGN PATENTS

| Number | Country | Date |
|---|---|---|
| 555,652 | Great Britain | Sept. 1, 1943 |